United States Patent [19]

Adler et al.

[11]  4,413,251

[45]  Nov. 1, 1983

[54] METHOD AND APPARATUS FOR GENERATING A NOISELESS SLIDING BLOCK CODE FOR A (1,7) CHANNEL WITH RATE $\frac{2}{3}$

[75] Inventors: Roy L. Adler; Martin Hassner; John P. Moussouris, all of Ossining, N.Y.

[73] Assignee: International Business Machines Corporation, Armonk, N.Y.

[21] Appl. No.: 283,758

[22] Filed: Jul. 16, 1981

[51] Int. Cl.$^3$ ............................................. H03K 13/00
[52] U.S. Cl. ............................................. 340/347 DD
[58] Field of Search ............... 340/347 DD; 235/310, 235/311; 360/39, 40, 41, 42

[56] References Cited

U.S. PATENT DOCUMENTS

| | | | |
|---|---|---|---|
| 3,689,899 | 9/1972 | Franaszek | 340/347 DD |
| 3,906,485 | 9/1975 | Hong | 340/347 DD |
| 3,995,264 | 11/1976 | Ouchi | 340/347 DD |

OTHER PUBLICATIONS

Adlr "Memoirs of the American Mathematical Society" Jul. 1979 vol. 20 No. 219.

Primary Examiner—C. D. Miller
Attorney, Agent, or Firm—Roy R. Schlemmer

[57] ABSTRACT

An algorithm and the hardware embodiment for producing a run length limited code useful in magnetic recording channels are described. The system described produces sequences which have a minimum of 1 zero and a maximum of 7 zeros between adjacent 1's. The code is generated by a sequential scheme that map 2 bits of unconstrained into 3 bits of constrained data. The encoder is a finite state machine whose internal state description requires 3 bits. It possesses the attractive feature of reset data blocks which reset it to a fixed state. The decoder requires a lookahead of two future channel symbols (6 bits) and its operation is channel state independent. The error propagation due to a random error is 5 bits. The hardware implementation is extremely simple and can operate at very high data speeds.

3 Claims, 7 Drawing Figures

INPUT
$\overline{S=s1\ s0}$,
  s1=MOST SIGNIFICANT BIT (MSB)
STATE
$\overline{X=x2\ x1\ x0}$,
  x2=MSB
NEXT STATE
$\overline{X'=x2'x1'x0'}$,
  x2'=MSB OUTPUT
$\overline{Y'=y2'y1'y0'}$, y2'=MSB

LEGEND:

NEXT STATE X' / NEXT OUTPUT Y'

INPUT: S = s1 s0, s1=MSB
STATE: X = x2 x1 x0, x2=MSB
NEXT STATE: X' = x2' x1' x0', x2'=MSB
NEXT OUTPUT: Y' = y2' y1' y0', y2'=MSB

|   | a | b | c | d | e | f |
|---|---|---|---|---|---|---|
| a | 0 | 1 | 0 |   | 1 | 0 |
| b | 0 | 0 | 1 |   | 0 | 0 |
| c | 0 | 0 | 1 |   | 1 | 0 |
| e | 0 | 1 | 0 |   | 0 | 0 |
| f | 1 | 1 | 0 |   | 0 | 1 |

| S \ X | s1 s0: 00 | 01 | 10 | 11 |
|---|---|---|---|---|
| x2 x1 x0: | 0 | 1 | 2 | 3 |
| 000 | 0/c | 1/c | 2/c | 3/c |
| 001 | 0/b | 1/b | 4/b | 4/c |
| 010 | 0/e | 1/e | 2/e | 3/e |
| 011 | 0/f | 1/f | 4/f | 4/e |
| 100 | 0/a | 1/a | 2/a | 3/a |
| 101 | 0/b | 1/b | 4/b | 4/a |
| 110 | 0/a | 1/a | 2/a | 3/a |
| 111 | 0/b | 1/b | 4/b | 4/a |

FIG.5
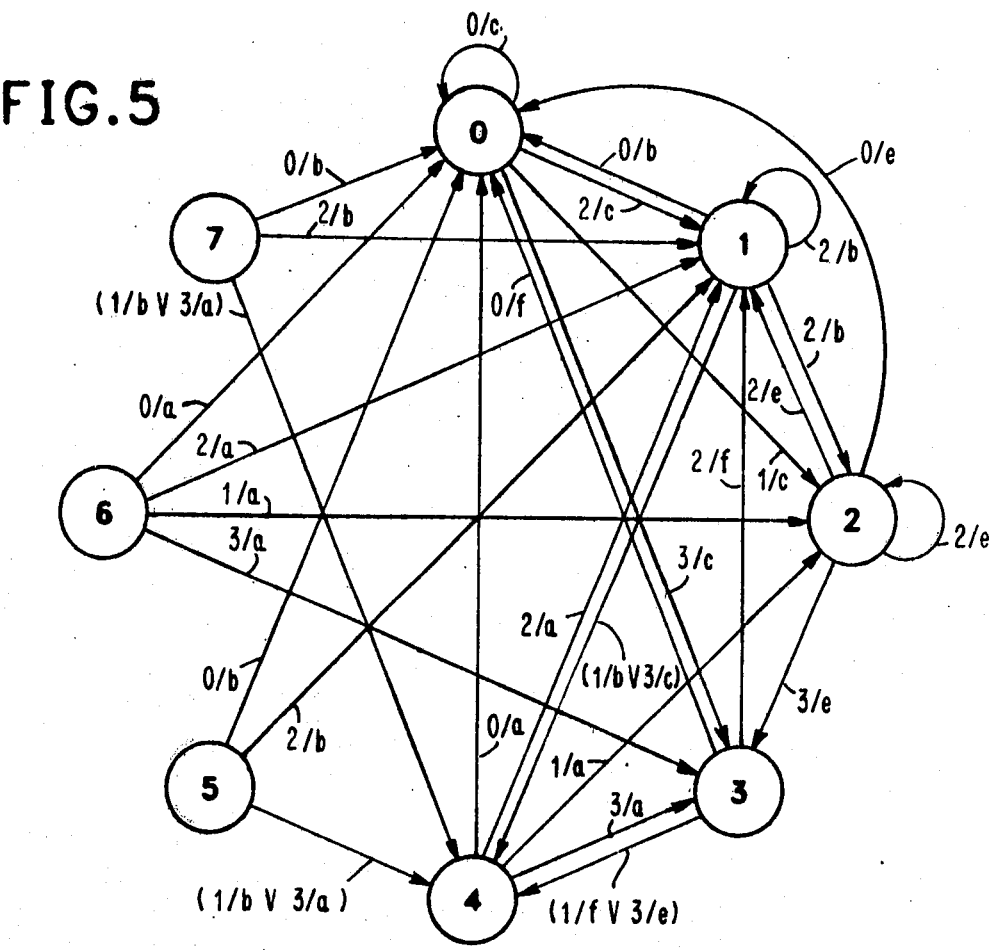
LEGEND:
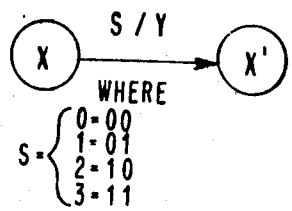
WHERE
$S = \begin{cases} 0 = 00 \\ 1 = 01 \\ 2 = 10 \\ 3 = 11 \end{cases}$

METHOD AND APPARATUS FOR GENERATING A NOISELESS SLIDING BLOCK CODE FOR A (1,7) CHANNEL WITH RATE ⅔

BACKGROUND OF THE INVENTION

1. Field of the Invention

This invention describes a sequential coding system which converts unconstrained data into a constrained format in an invertible manner. The described invention is particularly useful in dynamic memory systems.

2. Description of the Prior Art

Various ways have been proposed in the past for increasing the recorded data density on mediums such as magnetic discs or tapes and in other similar media. One approach utilized is known as run-length-limited coding which requires that each "1" in a coded bit sequence must be separated from the nearest adjacent "1" by a specified number of "0's". This number must be at least equal to a minimum quantity d because of intersymbol interference but must not exceed a maximum of k which is required for self-clocking purposes. Codes following this format are generally referred to as (d,k) run-length-limited codes. The present invention relates to a particular code suited for magnetic recording channels wherein $d=1$ and $k=7$. To convert unconstrained data into a (d,k)-constrained format generally requires that m unconstrained bits be mapped into n constrained bits, where $m<n$. The ratio m/n is usually referred to as the coding rate or efficiency. It is obviously desirable to maximize this rate. The tradeoffs usually considered in maximizing the rate are the decoding look-ahead and the hardware complexity.

Raising the coding efficiency or rate at the expense of decoding look-ahead generally results in increasing the error propagation. That is, a single bit error introduced in the code stream will cause a certain number of subsequent bits to also be erroneous before the coding algorithm becomes self-correcting. It is always desirable to minimize error propagation. It has been found that a coding rate of ⅔ is optimal for the (1,7) code.

U.S. Pat. No. 3,689,899 to P. A. Franaszek discloses two possible (d,k) codes (1,8) and (2,7). The potential data codes are variable length, fixed rate state independent block codes. The coding rate of the (1,8) code is ⅔ and its code dictionary consists of 16 code words whose lengths vary from 3 to 9 bits, in multiples of 3. The (2,7) code has a coding rate of ½ and its dictionary consists of seven words with lengths varying from 2 bits to 8 bits, in multiples of 2.

The following two references both disclose (d,k) codes having the particular run-length parameters (1,7) and a coding rate of ⅔ which are the same parameters chosen and implemented in the herein disclosed coding method. These two references are the article "Efficient Code for Digital Magnetic Recording" by P. A. Franaszek, in the IBM Technical Disclosure Bulletin, Vol. 23, No. 9, February 1981, page 4375, which is a bounded delay code, and the article "An Optimization of Modulation Codes in Digital Recording" by T. Horiguchi and K. Morita, IEEE Transactions on Magnetics, Vol. MEG-12, No. 6, November 1976, page 740. While the coding methods described in both of these articles will produce codes having the same (d,k) values as the herein disclosed code and the same coding rate ⅔, the actual coding tables will be different and the coding method differs in a number of respects.

The (1,7) code constructed by Franaszek has a finite look-ahead encoder and a variable length decoder. The encoder converts two data bits into 3 constrained bits by employing look-ahead of two additional data bits. The coded output is thus a function of the present two and the future two data bits. The decoder maps 3 constrained bits into two data bits as a function of the present channel state and for a particular channel state this dependence extends to the previous channel state. The error propagation of this code is 6 bits. The codes constructed by Horiguchi et al are variable length fixed rate codes. The error propagation of their code is 6 bits.

SUMMARY OF THE INVENTION

It is accordingly a primary object of the present invention to provide an improved method and apparatus for producing a d,k (1,7) run-length limited code.

It is a further object of the invention to provide such a code having a coding rate ⅔ where 2 unconstrained data bits are mapped into three constrained channel bits.

It is another object of the invention to provide such a code wherein error propagation at the decoder does not exceed 5 data bits. This error propagation is an improvement over the 6 bits of error propagation in the described prior art. Another advantage of this invention is the existence of reset data blocks which reset the finite state machine encoder into known fixed states which are independent of its initial state. This feature is absent in the prior art.

It is another object of the invention to provide a highly efficient encoder/decoder design for producing such a constrained (1,7) run-length limited code.

The objects of the present invention are met by using a novel sequential algorithm (described subsequently) for mapping unconstrained data into a constrained format in an invertible manner. Generally, for a specified set of (d,k) parameters this algorithm specifies finite state machine encoders and decoders that implement such maps.

For the specific set of parameters $d=1$, $k=7$, this algorithm specifies a finite state machine encoder whose internal state description requires 3 bits and is denoted by $X=(x2, x1, x0)$. This encoder is described by two Boolean functions: the next state transition function which maps the input $S=(s1,s0)$ and the present state $X=(x2, x1, x0)$ into the next state $X'=(x2, x1, x0)$, and the output function which maps the input $S=(s1,s0)$ and the present state $X=(x2, x1, x0)$ into the output $Y'(=y2', y1', y0')$. The decoder requires a lookahead of two channel symbols, each of which consists of 3 bits. These are denoted by $Y''=(y2'', y1'', y0'')$ and $y'''=(y2''', y1''', y0''')$. The decoder is specified by Boolean equations that are functions of $Y'=(y2, y1, y0)$ and of $Y''$ and $Y'''$. The decoder is thus channel state independent, a desirable feature absent in the prior art.

The hardware embodiment of the encoder and decoder as described in FIGS. 3 and 7 is extremely efficient both in terms of the total quantity of logic circuitry required and in terms of the maximum speed that it can achieve.

BRIEF DESCRIPTION OF THE DRAWINGS

FIG. 5 comprises a state diagram for the (1,7) encoder illustrated in FIG. 3 and specifically defined in the table of FIG. 4.

DESCRIPTION OF THE PREFERRED EMBODIMENT

Figure 1:
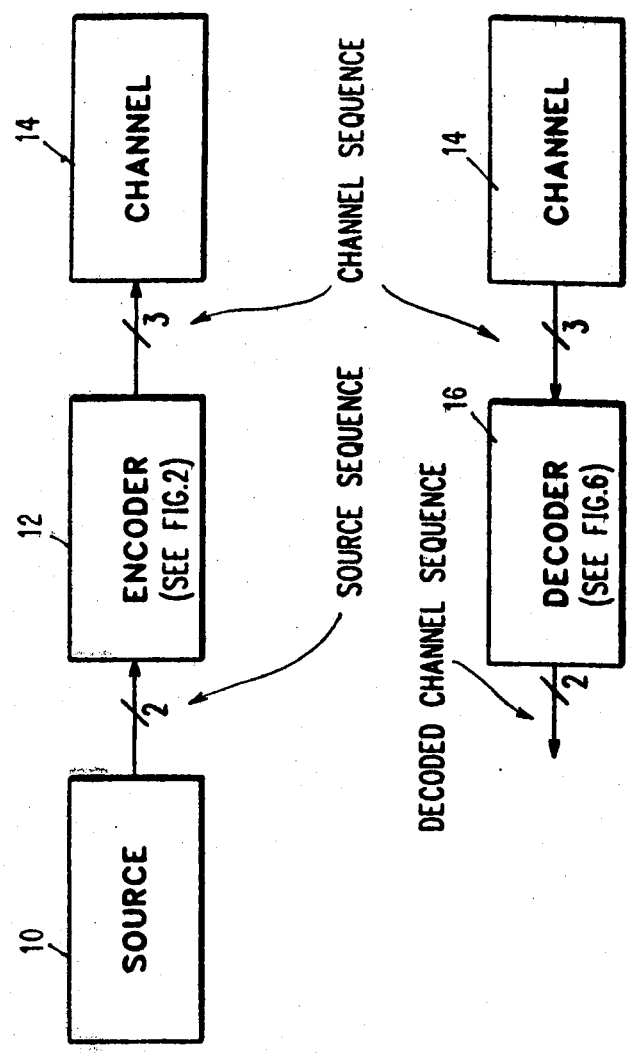
FIG. 1 comprises a functional block diagram of an encoding/decoding system in which the present coding method and apparatus would have utility.

Before presenting a detailed description of the suitable hardware embodiment for realizing the (1,7) run length limited code of the present invention there will follow a general description of the mathematical basis of the invention.

MATHEMATICAL BASIS FOR THE INVENTION

As stated previously, dynamic memory systems require data codes which impose lower and upper bounds on the runlengths of "0's" that occur between two "1's". A mathematical algorithm is described which permits the design of a finite state machine encoder and decoder for a channel specified by the lower and upper bound parameters d=1 and k=7, respectively. The coding rate is $\frac{2}{3}$ where two unconstrained data bits are mapped into 3 constrained channel bits. The error propagation at the decoder does not exceed 5 data bits. Another feature is the provision of reset data blocks. In particular the data block 00 resets the encoder to a fixed state (state 0 in the notation used in the following description).

The herein disclosed coding method was originally developed by utilizing a mathematically provable algorithm to described in an article by R. L. Adler and B. Marcus, "Topological Entropy and Equivalence of Dynamical Systems", Mem. A.M.S. 219 (1979). This article discloses an algorithmic approach to analyzing complex dynamic systems and suggests methods for formatting the problem to better design such systems. The herein disclosed coding method was developed utilizing some of the basic analytical concepts disclosed in this article.

The first input to the coding method is the state transition matrix T of the constrained (1,7) channel $$T = \begin{array}{c} a \\ b \\ c \\ e \\ f \end{array} \begin{array}{c} a \ b \ c \ e \ f \\ \left[ \begin{array}{ccccc} 0 & 1 & 1 & 1 & 1 \\ 1 & 1 & 1 & 0 & 0 \\ 1 & 1 & 1 & 1 & 1 \\ 1 & 1 & 1 & 1 & 1 \\ 1 & 1 & 1 & 0 & 0 \end{array} \right] \end{array} \begin{array}{l} a=000 \\ b=001 \\ c=010 \\ e=100 \\ f=101 \end{array}$$

The state transition matrix T specifies the admissible concatenations of the binary blocks {a,b,c,e,f} which label its rows and columns (Note: the letter d is omitted since it would correspond to the nonadmissible block 011 in the adopted letter-binary block correspondence).

A description of the matrix T which is more suitable for the algorithm described is a successor table.

| a | → |   | b | c | e | f |
|---|---|---|---|---|---|---|
| b | → | a | b | c |   |   |
| c | → | a | b | c | e | f |
| e | → | a | b | c | e | f |
| f | → | a | b | c |   |   |

The coding rate is determined by the channel capacity $C_T$ which is given as the basis two algorithm of the maximum eigenvalue $\lambda_T$ of the matrix T. This number is obtained generally from a procedure that computes eigenvalues of 0-1 matrices.

The entropy of the data is expressible as $\log_2 \lambda_M$ where for an unconstrained binary data source $\lambda_M = 2$. There exists $\lambda_T^3 > \lambda_M^2 = 4$ and hence the coding rate is $\frac{2}{3}$.

The second input to the coding algorithm, besides the successor table, is a right approximating eigenvector r that satisfies $$Tr > r$$

Generally this vector is obtained as the solution of an integer programming problem. For our particular invention this vector is $r = 4\ 3\ 5\ 5\ 3]^t$ and the inequality is actually an equality.

The algorithm splits the channel states {a,b,c,e,f} according to the components of the vector r in the appropriate order as follows (⇒ denotes splitting):

| a | ⇒ | a0 | a1 | a2 | a3 |    |
|---|---|----|----|----|----|----|
| b | ⇒ | b0 | b1 |    |    | b4 |
| c | ⇒ | c0 | c1 | c2 | c3 | c4 |
| e | ⇒ | e0 | e1 | e2 | e3 | e4 |
| f | ⇒ | f0 | f1 |    |    | f4 |

(Note: The labeling used above simplifies the complexity of the encoding device).

Splitting the channel states as above allows for the construction of a new successor table in which every new channel state possesses exactly four successors. Many rows in this table are identical and hence we can lump together states which are equivalent. The collapsed table is as follows:

| a0,b0,c0,e0,f0 | → | c0 | c1 | c2 | c3 |
| a1,b1,c1,e1,f1 | → | b0 | b1 | b4 | c4 |
| a2  c2,e2     | → | e0 | e1 | e2 | e3 |
| a3  c3,e3     | → | f0 | f1 | f4 | e4 |
| b4,c4,e4,f4   | → | a0 | a1 | a2 | a3 |

This table contains all the information required in the construction of both encoder and decoder. We rewrite it in a more suitable format.

|   |   | 00  | 10  | 01  | 11  |
|---|---|-----|-----|-----|-----|
| 0 | → | c,0 | c,1 | c,2 | c,3 |
| 1 | → | b,0 | b,1 | b,4 | c,4 |
| 2 | → | e,0 | e,1 | e,2 | e,3 |
| 3 | → | f,0 | f,1 | f,4 | e,4 |
| 4 | → | a,0 | a,1 | a,2 | a,3 |

ENCODING TABLE

In this table there appear five distinct states {0, 1, 2, 3, 4}. The incoming data is mapped, two bits at a time, into successor states. Thus 00 is encoded by the first state column whereas 11 is encoded into the fourth. The letters {a,b,c,e,f} associated with a state transition are the outputs resulting due to it. As a specific example

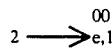

can be read as

where 00 is the input and e the output resulting from the transition 2→1 (Mealy-Moore automaton equivalence).

Figure 2:
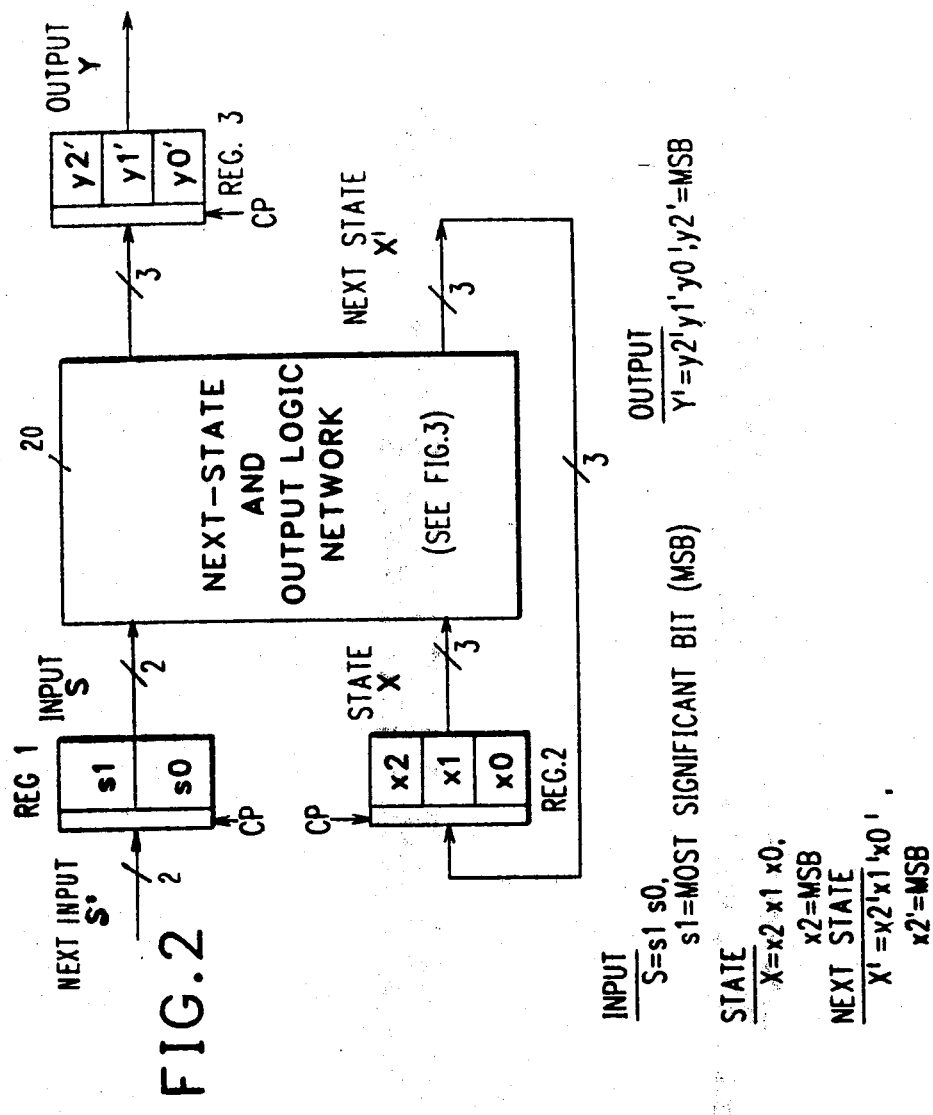
FIG. 2 is a functional block diagram of a finite state encoder suitable for use in the present invention.
Figure 3:
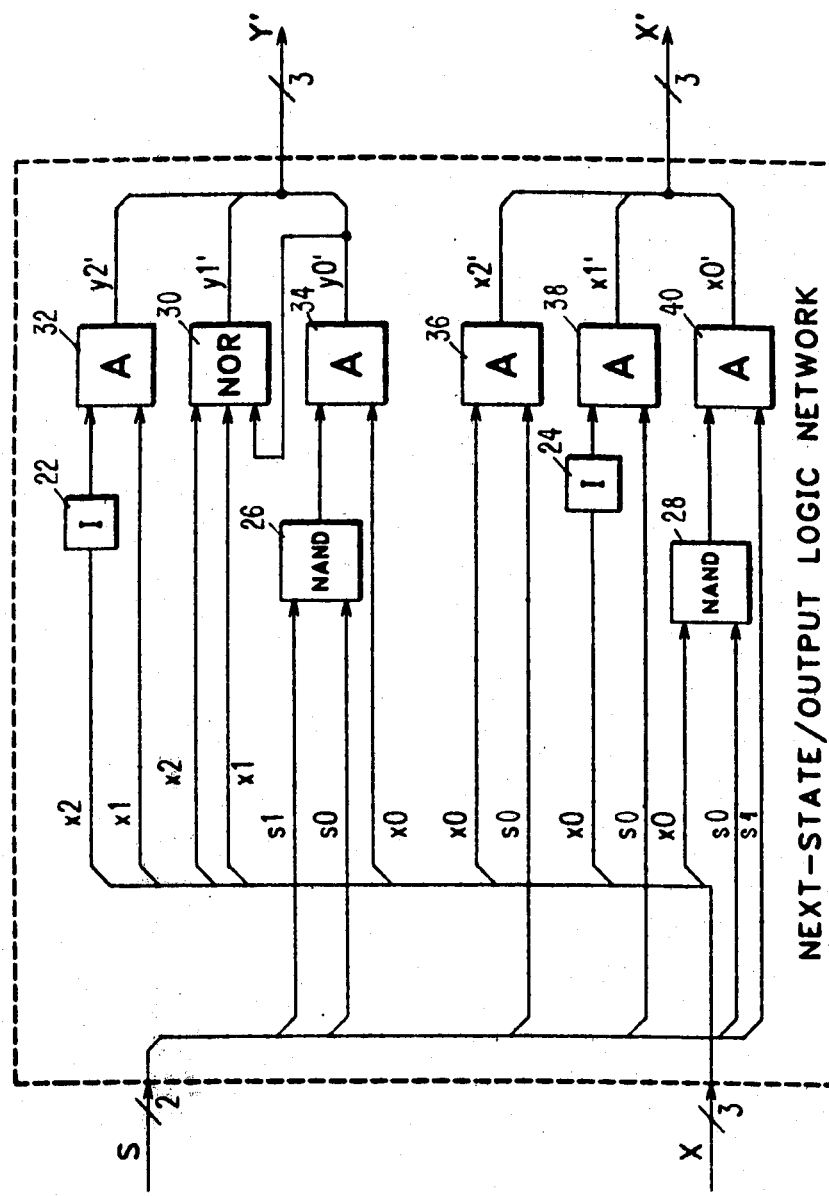
FIG. 3 is a logical schematic diagram of the next state and output logic network block of FIG. 2.

The state transition and output tables are described in FIGS. 2, 3 and 5. Since there are 5 distinct states their description requires 3 bits $X=(x_2,x_1,x_0)$. The notation used is described in FIG. 2. From the state transition and output table in FIG. 4, we notice that both 00 and 10 are reset blocks that reset the encoder to initial states 0 and 1, respectively. A hardware implementation of the finite state machine encoder is described in FIG. 3.

Figure 4:
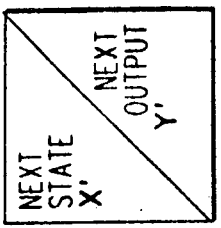
FIG. 4 comprises a state transition and output table for the encoder logic shown in FIG. 3 which defines the detailed outputs required for all possible data input and state input conditions.

The decoder construction is based on the particular structure of the table in FIG. 4. We observe the following properties:

(i) The next state depends only on the parity of the present state.
(ii) The output function depends only on the values of $S_0 \cap S_1$.

The decoder is specified by Boolean equations derived from the two Boolean tables describing the next state and output functions.

NEXT STATE TABLE
(Depends Only On the Parity of the Present State)

| Xo | S1 | So | X'2 | X'1 | X'o |
|----|----|----|-----|-----|-----|
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 0 | 0 | 0 |
| 1 | 0 | 1 | 0 | 0 | 1 |
| 1 | 1 | 0 | 1 | 0 | 0 |
| 1 | 1 | 1 | 1 | 0 | 0 |

OUTPUT TABLE
(Depends Only on So∩S1)

| X2 | X1 | Xo | So∩S1 | Y'2 | Y'1 | Y'o |   |
|----|----|----|-------|-----|-----|-----|---|
| 0 | 0 | 0 | 0 | 0 | 1 | 0 | c |
| 0 | 0 | 1 | 0 | 0 | 0 | 1 | b |
| 0 | 1 | 0 | 0 | 1 | 0 | 0 | e |
| 0 | 1 | 1 | 0 | 1 | 0 | 1 | f |
| 1 | 0 | 0 | 0 | 0 | 0 | 0 | a |
| 1 | 0 | 1 | 0 | 0 | 0 | 1 | b |
| 1 | 1 | 0 | 0 | 0 | 0 | 0 | a |
| 1 | 1 | 1 | 0 | 0 | 0 | 1 | b |
| 0 | 0 | 0 | 1 | 0 | 1 | 0 | c |
| 0 | 0 | 1 | 1 | 0 | 1 | 0 | c |
| 0 | 1 | 0 | 1 | 1 | 0 | 0 | e |
| 0 | 1 | 1 | 1 | 1 | 0 | 0 | e |
| 1 | 0 | 0 | 1 | 0 | 0 | 0 | a |
| 1 | 0 | 1 | 1 | 0 | 0 | 0 | a |
| 1 | 1 | 0 | 1 | 0 | 0 | 0 | a |
| 1 | 1 | 1 | 1 | 0 | 0 | 0 | a |

The decoder we construct is channel state independent, i.e., decodes independently of the channel state. The independence from the channel state is achieved by a look-ahead function that requires 3 channel symbols, including the present one. If we use the notation $$A^i = \overline{y_i}_2 \cap \overline{y_i}_1 \cap \overline{y_i}_o$$

where i goes from one to three "primes" then the decoder equations derived from the Boolean tables are as follows:

$$x2' = A''$$

$$x1' = y2''$$

$$x0' = y0'' \cup A'''$$

$$s1 = x0' \cup (x2' \cup \overline{y0'})$$

$$s0 = x1' \cup x2'$$

The equations express $X'=(x2',x1',x0')$, the next channel state, and $S=(s1,s0)$, the decoded output, in terms of the next channel symbols $Y'=(y2',y1',y0')$, $Y''=(y2'',y1'',y0'')$ and $Y'''=(y2''',y1''',y0''')$. Channel state independence is achieved by substituting the expressions for x2', x1', x0' into the Boolean expressions for s0 and s1. The resulting final Boolean equations are:

$$s0 = y2'' \cup A''$$

$$s1 = (y_0'' \cup A''') \cup (A'' \cap \overline{Y_0'})$$

Figure 7:
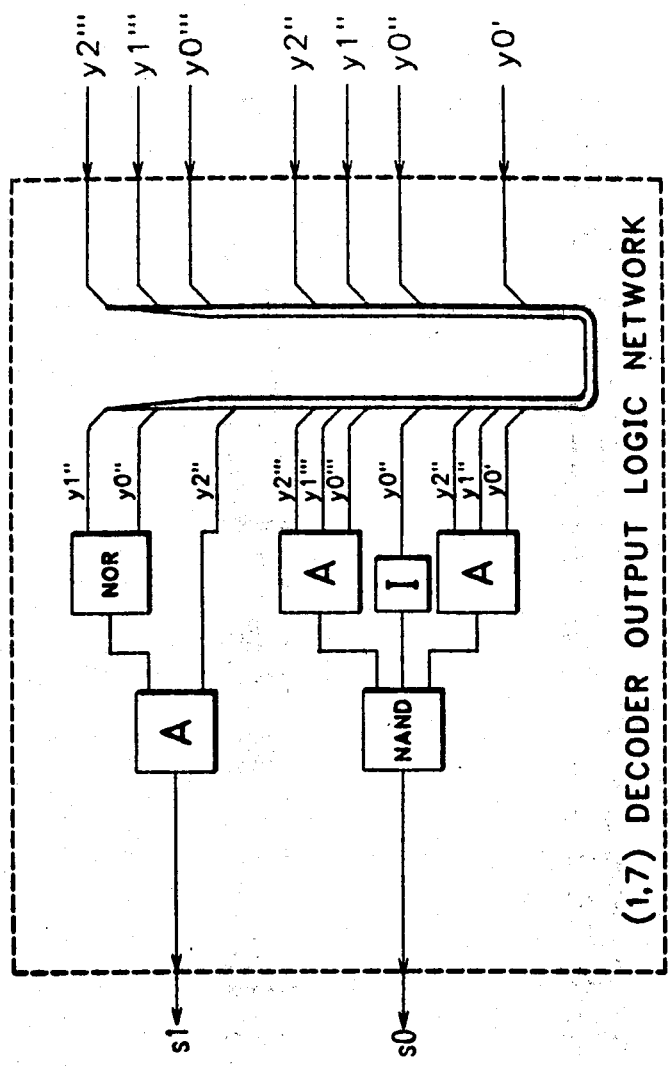
FIG. 7 is a logic systematic diagram of the (1,7) decoder output logic network block shown in FIG. 6 similar to FIG. 3 of the encoder hardware.

The decoder thus becomes channel state independent. The hardware implementation of the Boolean equations for s0 and s1 is described in FIG. 7.

Provided an error occurs this error will not be propagated by more than two additional channel symbols. Since a channel symbol corresponds to two data bits, the error propagation of the decoder does not exceed 6 data bits. The actual error propagation is 5 bits.

Having described the underlying concepts of the present coding approach, there will now follow a detailed description of a preferred embodiment of a hardware realization of the invention.

The sliding block codes described are sequential schemes which employ look ahead at the decoder. These codes differ from the bounded delay codes of P. Franaszek which employ look ahead at the encoder.

Referring now to FIG. 1, there is shown a high level functional block diagram of a typical encoding/decoding system which would describe any system that required the conversion of unconstrained data to a constrained code regardless of the coding formats. The source block 10 represents a source of binary data which is supplied 2 bits at a time to the encoder 12. The output of the encoder is a sequence generated by catenations of 3 bit words in a constrained list of size 5. The coded sequence is matched to the characteristics of the channel. As described previously, it is assumed that the channel in the present embodiment would be a magnetic recording medium such as a magnetic disc, tape, or the like. However, as will be appreciated by those skilled in the art, the channel could also be a transmission medium, etc.

When it is desired to decode the coded data from the channel back into its original format, the encoded (or constrained) data is supplied 3 bits at a time to the decoder which, as will be well understood, performs the reverse function of the encoder to produce the sequence of 2 bit unconstrained data groups or segments.

Referring to FIG. 2, a functional block diagram of the encoder is set forth. The encoder, as is apparent from the drawing comprises 3 registers 1, 2 and 3, and a block denoted as the next state and output logic network. This block embodies a finite state machine consisting of a minimum amount of a conventional logic circuitry which is shown in detail in FIG. 3. From FIG. 2 it will be noted that register 1 is utilized to store the data input vector S comprising bits s0 and s1. Register 2 is utilized to store the state vector X which comprises bits x0, x1, x2. Similarly, register 3 is utilized to store the constrained channel vector Y' comprising bits y0', y1', y2'. The individual bits making up the particular data vectors are set forth clearly in the drawings, however, they are repeated in the following table for clarity. It will be noted that the capital letter stands for the particular multi-bit data vector and the small letters refer to the individual bits, e.g. the 2 bit input vector S is composed of the 2 bits s1 and s0, etc.

| TABLE OF DEFINITIONS | |
|---|---|
| INPUT | OUTPUT |
| S=s1s0, | Y'=y2'y1'y0', |
| s1=most significant bit (MSB) | y2=MSB |
| STATE | |
| X=x2x1x0, | |
| x2=MSB | |
| NEXT STATE | |
| X'=x2'x1'x0', | |
| x2'=MSB | |

The data flow within the encoder may be clearly seen from FIG. 2 wherein the input vector S consisting of two unconstrained data bits, enters the encoder logic network 20 in the upper left-hand corner. Concurrently, the state vector X, comprising 3 bits enters the lower left-hand corner as indicated. The output from the encoder network 20 comprises the actual output channel bits Y' and the next state bits X'.

The data flow and details of the next state and output logic network 20 are clearly shown in FIG. 3. The simplicity of the design of the hardware embodiment of the present encoder is evident in this figure. A total of ten conventional logic circuits perform the entire encoding operation. The dramatic savings in circuitry may be readily seen by contrasting the present circuitry with, for example, the circuitry required to perform the encoding operation in the prior art. The ten logic circuits specifically required are 2 inverters 22 and 24, 2 nand circuits 26 and 28, 1 nor circuit 30 and 5, and circuits 32, 34, 36, 38 and 40. The operation of the logic circuits in the wiring of the particular bit lines for the two bit S vector and the 3 bit X vector are clearly labeled. Similarly, the specific bit lines for the two outputs comprising the Y' vector and the X' vector are clearly labeled.

Referring now to FIG. 4, the state machine transition table for the herein disclosed (1,7) encoder having a coding rate ⅔ is illustrated. This table, specifies every possible combination of inputs (S and X) to the encoder and similarly specifies the precise outputs (Y' and X') which will be produced for any given set of inputs. The left hand column defines the possible state vector entries into the table and thus all of the particular 3 bit state vector X configurations possible. Across the top of the table the possible bit configurations of the 2 bit input vector S are specified.

The upper diagonal of each of the table entries specifies the next state X' and the lower diagonal specifies the next output vector Y'. The particular bit configuration for both inputs is specifically set forth in the row and column headings and the bit configuration for the next output vector is specified in the table at the bottom of the 'legend' which accompanies the figure. Thus, referring to the 'legend' table, if an output vector f is specified, it means that the output vector Y' for those particular inputs would be 101.

To give an example of the way the table may be used, consider an input state vector X equal to 010. This would mean that row 2 of the table would be specified and assume that a data vector S equal to 11 occured. This would specify column 3 of the table. The entry in row 2 and column 3 of the table is 3/e. This means that the next state vector X' produced would be 011 and similarly, the resultant output Y' would be e which, as a binary bit pattern (referring to the table) of 100.

It should be clearly understood that the present encoder works in exactly the same way regardless of the configuration of the input vectors S and the state vectors X. All such permitted vectors are completely evaluated and accounted for in the present hardware.

It should be noted however, that the 3 states represented as rows 5, 6 and 7 in the table do not actually exist as they have been found not to be necessary. However, their positions are shown to completely evaluate all possible configurations of the next state vector X.

Noting the contents of the table, none of the table entires map to a next state vector of 5, 6 or 7. Thus, even though one of these vectors was used as an initializing input to the state vector input (X) to the encoder, a portion of the table would never be entered subsequently.

It should be clearly understood that the particular labels and order of the various S vector input bit combinations and the X vector input bit combinations are for convenience of reference only.

The significant entries or contents of the table are the actual binary bit configurations shown. Stated differently, the significant contents of the table of FIG. 4 are the sequences of "1's" and "0's". Thus assuming an X vector input of 001 and an S vector input of 01, the significant information in the table is that a next state vector X' of 001 would be produced and a next output vector Y' 001 would be produced. Whether this information is in row 1 or column 1 of the table is irrelevant.

The (1,7) encoder state diagram of FIG. 5 is included to illustrate graphically the state transitions which may occur within the encoder. Each of the numbered circles or nodes, represents a particular coding state which represents the particular binary configuration specified in table 4. Thus, node 4 would correspond to a coding state wherein the state vector X has the binary configuration 100. The 4 arrows leaving node 4 are labeled 0/a, 1/a, 2/a, and 3/a. It will be noted that these arrows point to nodes 0, 1, 2 and 3 respectively. The numbers on the arrows have the following significance. The 2 in the 2/a arrow indicates that data vector S is 10 (as shown in col. 2 of FIG. 4) and the next output vector Y' is 000 (from the "legend" table in FIG. 4). Finally, the next state vector X' is represented by node 1 which implies the binary value of 001. It is only conicidental that certain of the numbers defining the arrows appear to point to the same node as specified in the S vector labels of FIG. 4.

It will also be noted in FIG. 5 that the three nodes, 5, 6 and 7 map to other nodes but that none of the nodes 0-4 will map into the nodes 5, 6 or 7. Thus, nodes 5, 6 or 7 could be used as initializing state vectors, however, the remaining operations would occur completely within those portions of the table indicated by the state nodes 0 through 4.

Figure 6:
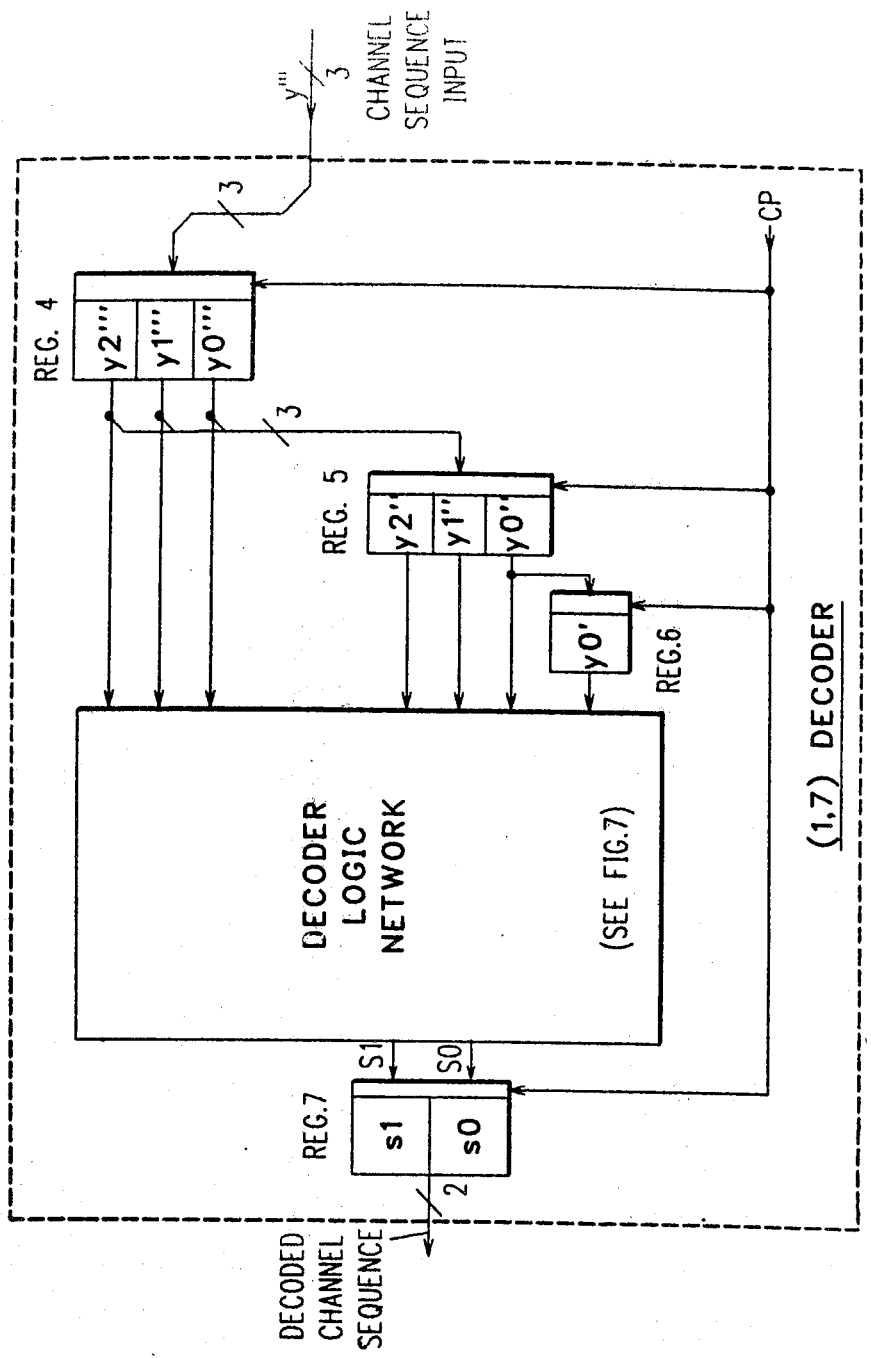
FIG. 6 is a functional block diagram similar to FIG. 2 of a finite state decoder suitable for use in the present system.

Referring now to FIG. 6, a functional block diagram of the present (1,7) decoder is set forth. It will be noted that this figure is quite similar to FIG. 2 of the encoder, however, with the decoding operation it is not necessary to generate and retain the state information. The decoder is solely a function of the current channel symbol and the future two channel symbols. Thus, unlike the encoder, it does not possess an internal state that has to be computed and fed back to its input.

Registers 4, 5 and 6 respectively store as indicated, various groups of channel bits. Register 4 contains the next-next channel symbol Y'''. Register 5 contains the 3 bits of the next channel symbol Y'' and register 6 contains the single bit y0' of the current channel symbol Y'. As is apparent, these bits are gated directly into the decoder logic network shown in FIG. 7 to produce the two desired output data bits s0 and s1.

Since the decoder is not a finite state machine and it is specified in a concise manner by two Boolean equations we feel that a Boolean table which would specify (s1,s0) as a function of y0', y2'', y1'', y.'', y2''', y4''', y0''') will not add too much. These equations are derived from the state transition table in FIG. 4, which hence describes both encoder and decoder.

INDUSTRIAL APPLICABILITY

The encoder/decoder method and apparatus of the present invention has particular utility in dynamic recording systems, such as magnetic recording channels wherein a particular (1,7) run length limited code provides superior recording results in the magnetic channel as is well known in the art.

As is apparent from the preceding description, the hardware is extremely efficient in that an absolute minimum of circuitry is required and, as will be appreciated from the logical schematic diagrams, a minimum number of levels are required in the logic circuitry, thus enabling it to operate very rapidly.

The economic advantages to such a system when compared with run length limited encoder/decoder hardware utilized in the prior art are obvious. The 5 bit error propagation inherent in the code is smaller than in previously existing codes, thus rendering the coding method more valuable.

Having thus described my invention, what I claim as new, and desire to secure by Letters Patent is:

1. An encoder for producing a run length limited (RLL) code for use in a structurally constrained environment having a minimum of 1 and a maximum of seven 0's between adjacent 1's and a coding rate ⅔, said encoder comprising means for receiving as an input vector for a given encoding operation two new message bits (S) and a three bit state vector (X) derived from the immediately preceding encoding operation, logic circuit means for producing a channel vector (Y') obeying said RLL coding rules and a next state vector (X') which becomes the state vector (X) for use in the next encoding operation wherein the vectors Y' and X' are functions of all five input bits to the encoder logic circuit means.

2. An encoder as set forth in claim 1 wherein said logic circuit means comprises a maximum of two functional logic levels.

3. An encoder as set forth in claim 2 wherein said logic circuit means performs a mapping function to map the two input vectors S and X into the two output vectors Y' and X' according to the mapping function table:

| STATE DATA x2,x1,x0 | INPUT s1,s0 | | | |
|---|---|---|---|---|
| | 00 | 10 | 01 | 11 |
| 000 | 000 / 010 | 001 / 010 | 010 / 010 | 011 / 010 |
| 001 | 000 / 001 | 001 / 001 | 100 / 001 | 100 / 010 |
| 010 | 000 / 100 | 001 / 100 | 010 / 100 | 011 / 100 |
| 011 | 000 / 101 | 001 / 101 | 100 / 101 | 100 / 100 |
| 100 | 000 / 000 | 001 / 000 | 010 / 000 | 011 / 000 |

LEGEND:

INPUT: S=s1s0,s1=MSB
STATE: X=x2x1x0,x2=MSB
NEXT STATE: X'=x2'x1'x0',x2'=MSB
NEXT OUTPUT: Y'=y2'y1'y0',y2'=MSB

* * * * *